(12) United States Patent
Ito et al.

(10) Patent No.: US 12,378,911 B2
(45) Date of Patent: Aug. 5, 2025

(54) GAS TURBINE SYSTEM

(71) Applicant: IHI Corporation, Tokyo (JP)

(72) Inventors: Shintaro Ito, Tokyo (JP); Toshiro Fujimori, Tokyo (JP); Wonyoung Choi, Tokyo (JP); Masahiro Uchida, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 18/545,812

(22) Filed: Dec. 19, 2023

(65) Prior Publication Data

US 2024/0117763 A1    Apr. 11, 2024

Related U.S. Application Data

(63) Continuation of application No. PCT/JP2022/014107, filed on Mar. 24, 2022.

(30) Foreign Application Priority Data

Jul. 14, 2021    (JP) ................. 2021-116151

(51) Int. Cl.
*F02C 3/22*   (2006.01)
*C01B 3/04*   (2006.01)
(Continued)

(52) U.S. Cl.
CPC ............. *F02C 3/22* (2013.01); *C01B 3/047* (2013.01); *C01B 3/501* (2013.01); *F02C 7/22* (2013.01)

(58) Field of Classification Search
None
See application file for complete search history.

(56) References Cited

U.S. PATENT DOCUMENTS 4,106,286 A  *  8/1978  Sakai ................ F02G 5/02
                                                60/39.5
2011/0011354 A1    1/2011  Dincer et al.
(Continued)

FOREIGN PATENT DOCUMENTS

CN          112761826 A       5/2021
EP            4001618 A2      5/2022
(Continued)

OTHER PUBLICATIONS

International Search Report for International Application No. PCT/JP2022/014107 dated Jun. 7, 2022 with English translation (4 pp.).

*Primary Examiner* — David P. Olynick
(74) *Attorney, Agent, or Firm* — Rothwell, Figg, Ernst & Manbeck, P.C.

(57) ABSTRACT

A gas turbine system includes: a combustor; an intake flow passage connected to the combustor; an exhaust flow passage connected to the combustor; a compressor provided in the intake flow passage; a turbine provided in the exhaust flow passage; an ammonia tank; and a hydrogen generator-separator having an ammonia supply port connected to the ammonia tank and a hydrogen discharge port connected to the combustor, the hydrogen generator-separator being arranged on a downstream side of the turbine in the exhaust flow passage or on a downstream side of the compressor in the intake flow passage, the hydrogen generator-separator including an ammonia cracking catalyst and a hydrogen separation membrane.

9 Claims, 10 Drawing Sheets

(51) Int. Cl.
  *C01B 3/50*  (2006.01)
  *F02C 7/22*  (2006.01)

(56) References Cited

U.S. PATENT DOCUMENTS

| | | | |
|---|---|---|---|
| 2017/0298838 A1* | 10/2017 | Sathyakumar | F02C 3/04 |
| 2018/0209306 A1* | 7/2018 | Heid | F01K 13/02 |
| 2019/0322526 A1 | 10/2019 | Kambara et al. | |
| 2019/0360397 A1 | 11/2019 | Ito et al. | |
| 2020/0023315 A1* | 1/2020 | Ito | F01D 5/185 |
| 2020/0032676 A1 | 1/2020 | Nose et al. | |
| 2020/0197889 A1 | 6/2020 | Jo et al. | |
| 2022/0162989 A1* | 5/2022 | Cocks | F23R 3/36 |
| 2022/0162999 A1* | 5/2022 | Cocks | F23R 3/36 |
| 2022/0193629 A1 | 6/2022 | Kambara et al. | |

FOREIGN PATENT DOCUMENTS

| | | |
|---|---|---|
| EP | 4227501 A1 | 8/2023 |
| JP | H04-342829 A | 11/1992 |
| JP | 2018-076794 A | 5/2018 |
| JP | 2018-188315 A | 11/2018 |
| JP | 2021-046332 A | 3/2021 |
| WO | 2019/104375 A1 | 6/2019 |
| WO | 2020/189575 A1 | 9/2020 |
| WO | 2020/217998 A1 | 10/2020 |

\* cited by examiner

GAS TURBINE SYSTEM

CROSS REFERENCE TO RELATED APPLICATIONS

This application is a continuation application of International Application No. PCT/JP2022/014107, filed on Mar. 24, 2022, which claims priority to Japanese Patent Application No. 2021-116151, filed on Jul. 14, 2021, the entire contents of which are incorporated by reference herein.

BACKGROUND ART

Technical Field

The present disclosure relates to a gas turbine system. This application claims the benefit of priority to Japanese Patent Application No. 2021-116151 filed on Jul. 14, 2021, and contents thereof are incorporated herein.

Related Art

A gas turbine system that combusts fuel in a combustor to obtain power has been used. As the gas turbine system, there exists a gas turbine system that uses ammonia as fuel. Emission of carbon dioxide is suppressed by using ammonia as fuel. Ammonia is less combustible than other fuels and has flame retardancy. Thus, for example, as disclosed in Patent Literature 1, in order to improve combustibility, there has been proposed a technology of cracking ammonia into hydrogen and nitrogen and supplying the obtained hydrogen to a combustor.

CITATION LIST

Patent Literature

Patent Literature 1: JP 2018-076794 A

SUMMARY

Technical Problem

Energy is required to generate hydrogen from ammonia. Thus, it is desired that energy that is consumed to ensure a supply amount of hydrogen to the combustor be reduced to thereby improve efficiency of the gas turbine system as a whole.

An object of the present disclosure is to improve efficiency of a gas turbine system.

Solution to Problem

In order to solve the above-mentioned problem, according to the present disclosure, there is provided a gas turbine system, including: a combustor; an intake flow passage connected to the combustor; an exhaust flow passage connected to the combustor; a compressor provided in the intake flow passage; a turbine provided in the exhaust flow passage; an ammonia tank; and a hydrogen generator-separator having an ammonia supply port connected to the ammonia tank and a hydrogen discharge port connected to the combustor, the hydrogen generator-separator being arranged on a downstream side of the turbine in the exhaust flow passage or on a downstream side of the compressor in the intake flow passage, the hydrogen generator-separator including an ammonia cracking catalyst and a hydrogen separation membrane.

The hydrogen discharge port of the hydrogen generator-separator may be connected to the combustor with a first gas reservoir provided therebetween.

The hydrogen generator-separator may have a nitrogen discharge port, and the nitrogen discharge port of the hydrogen generator-separator may be connected to the combustor.

The hydrogen discharge port of the hydrogen generator-separator may be connected to the combustor with a second gas reservoir provided therebetween.

A pump may be provided in a flow passage that connects the ammonia tank and the ammonia supply port of the hydrogen generator-separator to each other.

The hydrogen generator-separator may have a nitrogen discharge port, a denitration device may be provided on a downstream side of the turbine in the exhaust flow passage, and the nitrogen discharge port of the hydrogen generator-separator may be connected to the denitration device.

The hydrogen generator-separator may have a nitrogen discharge port, and the nitrogen discharge port of the hydrogen generator-separator may be connected to the turbine.

Effects of Disclosure

According to the present disclosure, it is possible to improve the efficiency of the gas turbine system.

DESCRIPTION OF EMBODIMENTS

Now, with reference to the attached drawings, an embodiment of the present disclosure is described. The dimensions, materials, and other specific numerical values represented in the embodiment are merely examples used for facilitating the understanding of the disclosure, and do not limit the present disclosure otherwise particularly noted. Elements having substantially the same functions and configurations herein and in the drawings are denoted by the same reference symbols to omit redundant description thereof. Further, illustration of elements with no direct relationship to the present disclosure is omitted.

Figure 1:
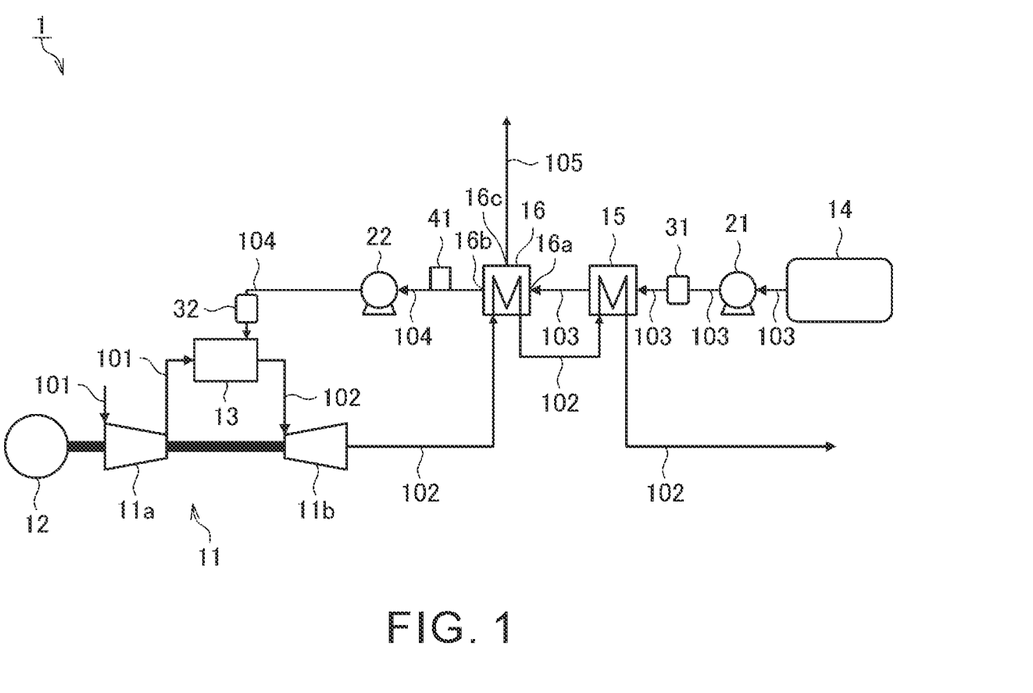
FIG. 1 is a schematic view for illustrating a configuration of a gas turbine system according to an embodiment of the present disclosure.

FIG. 1 is a schematic view for illustrating a configuration of a gas turbine system 1 according to this embodiment. As illustrated in FIG. 1, the gas turbine system 1 includes a turbocharger 11, a power generator 12, a combustor 13, an ammonia tank 14, a vaporizer 15, a hydrogen generator-separator 16, a first pump 21, a second pump 22, a first flow rate control valve 31, a second flow rate control valve 32, and a first cooling device 41.

The turbocharger 11 includes a compressor 11a and a turbine 11b. The compressor 11a and the turbine 11b rotate integrally. The compressor 11a and the turbine 11b are coupled to each other through intermediation of a shaft.

The compressor 11a is provided in an intake flow passage 101 connected to the combustor 13. Air to be supplied to the combustor 13 flows through the intake flow passage 101. An intake port (not shown) is formed at an upstream-side end portion of the intake flow passage 101. The intake port allows air to be introduced from an outside. The air introduced through the intake port passes through the compressor 11a and is sent to the combustor 13. The compressor 11a compresses the air and discharges the compressed air to a downstream side.

The turbine 11b is provided in an exhaust flow passage 102 connected to the combustor 13. An exhaust gas discharged from the combustor 13 flows through the exhaust flow passage 102. An exhaust port (not shown) is formed at a downstream-side end portion of the exhaust flow passage 102. The exhaust port allows the exhaust gas to be discharged to the outside. The exhaust gas discharged from the combustor 13 passes through the turbine 11b and is sent to the exhaust port. The turbine 11b is rotated by the exhaust gas to generate rotational power.

The power generator 12 is connected to the turbocharger 11. The power generator 12 generates electric power with use of the rotational power generated by the turbocharger 11.

The combustor 13 includes a combustion chamber (not shown). The air compressed by the compressor 11a is supplied to the combustion chamber of the combustor 13 through the intake flow passage 101. As described later, hydrogen is supplied as fuel from the hydrogen generator-separator 16 to the combustion chamber of the combustor 13. An air-fuel mixture containing fuel and air is generated in the combustion chamber of the combustor 13. An exhaust gas generated as a result of combustion in the combustion chamber of the combustor 13 is discharged to the exhaust flow passage 102.

Liquid ammonia is stored in the ammonia tank 14. The ammonia tank 14 is connected to the hydrogen generator-separator 16 through intermediation of a flow passage 103. Thus, ammonia can be supplied from the ammonia tank 14 to the hydrogen generator-separator 16.

The first pump 21, the first flow rate control valve 31, and the vaporizer 15 are arranged in the flow passage 103 in the stated order from an upstream side. The first pump 21 compresses ammonia supplied from the ammonia tank 14 and feeds the compressed ammonia to a downstream side. The liquid ammonia fed by the first pump 21 is sent to the vaporizer 15 through the first flow rate control valve 31. The first flow rate control valve 31 controls a flow rate of ammonia flowing through the flow passage 103. When an opening degree of the first flow rate control valve 31 is adjusted, the amount of liquid ammonia supplied from the ammonia tank 14 to the vaporizer 15 is adjusted. The vaporizer 15 is arranged on a downstream side of the turbine 11b in the exhaust flow passage 102. More specifically, ammonia in the vaporizer 15 and an exhaust gas flowing through the exhaust flow passage 102 can exchange heat under a state in which an inside of the vaporizer 15 and an inside of the exhaust flow passage 102 are not in communication with each other. The liquid ammonia sent to the vaporizer 15 is heated with the exhaust gas flowing through the exhaust flow passage 102, and is vaporized. The ammonia vaporized in the vaporizer 15 is sent to the hydrogen generator-separator 16.

The hydrogen generator-separator 16 cracks ammonia into hydrogen and nitrogen, and separates hydrogen from a cracked gas containing hydrogen and nitrogen. The hydrogen generator-separator 16 has an ammonia supply port 16a, a hydrogen discharge port 16b, and a nitrogen discharge port 16c.

The ammonia tank 14 is connected to the ammonia supply port 16a through intermediation of the flow passage 103. Ammonia sent from the ammonia tank 14 is supplied into the hydrogen generator-separator 16 via the ammonia supply port 16a. The combustor 13 is connected to the hydrogen discharge port 16b through intermediation of a flow passage 104. Hydrogen, which is generated and separated in the hydrogen generator-separator 16, is sent to the flow passage 104 via the hydrogen discharge port 16b. The hydrogen sent to the flow passage 104 is supplied to the combustor 13. A flow passage 105 is connected to the nitrogen discharge port 16c. Gas containing nitrogen generated as a result of the cracking of ammonia and residual uncracked ammonia in the hydrogen generator-separator 16 is sent to the flow passage 105 via the nitrogen discharge port 16c. The gas containing the residual ammonia, which is sent to the flow passage 105, is, for example, purified by a purification device (not shown), and is discharged to the outside.

Figure 2:
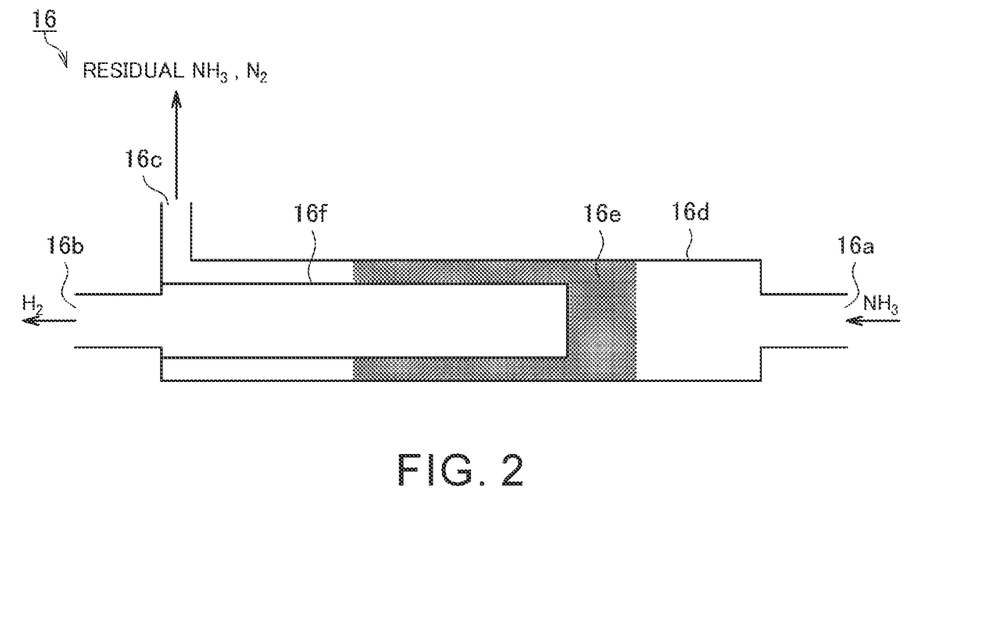
FIG. 2 is a schematic sectional view for illustrating a configuration of a hydrogen generator-separator according to the embodiment of the present disclosure.

FIG. 2 is a schematic sectional view for illustrating a configuration of the hydrogen generator-separator 16. As illustrated in FIG. 2, the hydrogen generator-separator 16 includes a housing 16d, an ammonia cracking catalyst 16e, and a hydrogen separation membrane 16f. The ammonia cracking catalyst 16e is a catalyst that cracks ammonia into hydrogen and nitrogen. The hydrogen separation membrane 16f is a membrane that allows selective permeation of hydrogen contained in the cracked gas obtained by the cracking of ammonia. The hydrogen separation membrane 16f is formed of, for example, palladium, an alloy containing palladium, vanadium, or an alloy containing vanadium. The ammonia cracking catalyst 16e and the hydrogen separation membrane 16f are accommodated in the housing 16d. The hydrogen generator-separator 16 is also referred to as "membrane reactor".

The housing 16d has, for example, a cylindrical shape. In an example illustrated in FIG. 2, the housing 16d extends in a right-and-left direction. The hydrogen separation membrane 16f has a cylindrical shape, and is arranged coaxially with the housing 16d. The hydrogen separation membrane 16f extends from a left end to a right end of the housing 16d. A left end of the hydrogen separation membrane 16f is open. Meanwhile, a right end of the hydrogen separation membrane 16f is closed. The ammonia cracking catalyst 16e is supplied between an outer surface of the hydrogen separation membrane 16f and an inner peripheral surface of the housing 16d. A right end surface of the hydrogen separation membrane 16f is covered with the ammonia cracking catalyst 16e on its right side. An outer peripheral surface of a right portion (specifically, a portion on the ammonia supply port 16a side) of the hydrogen separation membrane 16f is covered with the ammonia cracking catalyst 16e on its radially outer side. Part of a space inside the housing 16d, which is located on an outside of the hydrogen separation membrane 16f, is partitioned by the ammonia cracking catalyst 16e into a right space and a left space with respect to the ammonia cracking catalyst 16e.

The ammonia supply port 16a is formed at the right end of the housing 16d. The ammonia supply port 16a communicates with the right space with respect to the ammonia cracking catalyst 16e, which is included in the space inside the housing 16d. The hydrogen discharge port 16b is formed at the left end of the housing 16d. The hydrogen discharge port 16b communicates with a space inside the hydrogen separation membrane 16f. The nitrogen discharge port 16c is formed in an outer peripheral surface of the housing 16d so as to be located on a left side of the ammonia cracking catalyst 16e. The nitrogen discharge port 16c communicates with the left space with respect to the ammonia cracking catalyst 16e, which is included in the space defined by an outer peripheral surface of the hydrogen separation membrane 16f and the inner peripheral surface of the housing 16d.

Ammonia supplied from the ammonia supply port 16a into the housing 16d is cracked into hydrogen and nitrogen by the ammonia cracking catalyst 16e. Thus, the cracked gas obtained by the cracking of ammonia contains hydrogen and nitrogen. The cracked gas containing hydrogen and nitrogen may also contain residual uncracked ammonia. The hydrogen generator-separator 16 is arranged on a downstream side of the turbine 11b in the exhaust flow passage 102. More specifically, the hydrogen generator-separator 16 and the exhaust gas flowing through the exhaust flow passage 102 can exchange heat under a state in which the inside of the hydrogen generator-separator 16 and the inside of the exhaust flow passage 102 are not in communication with each other. Hence, the ammonia cracking catalyst 16e of the hydrogen generator-separator 16 is heated with the exhaust gas flowing through the exhaust flow passage 102 to a temperature around which the cracking of ammonia actively occurs.

Hydrogen contained in the cracked gas permeates through the hydrogen separation membrane 16f, and is sent to the space inside the hydrogen separation membrane 16f. The hydrogen, which has permeated through the hydrogen separation membrane 16f, is discharged from the hydrogen discharge port 16b. The residual ammonia and the nitrogen contained in the cracked gas are discharged from the nitrogen discharge port 16c without permeating through the hydrogen separation membrane 16f. Part of the hydrogen contained in the cracked gas can also be discharged from the nitrogen discharge port 16c without permeating through the hydrogen separation membrane 16f.

An example of the hydrogen generator-separator 16 has been described with reference to FIG. 2. However, shapes and arrangement of the components of the hydrogen generator-separator 16 are not limited to those in the example illustrated in FIG. 2. For example, the ammonia cracking catalyst 16e may be provided in the space inside the hydrogen separation membrane 16f. For example, the space inside the hydrogen separation membrane 16f is partitioned by the ammonia cracking catalyst 16e into two spaces. The ammonia supply port 16a communicates with one of the spaces separated by the ammonia cracking catalyst 16e inside the hydrogen separation membrane 16f. The nitrogen discharge port 16c communicates with another one of the spaces separated by the ammonia cracking catalyst 16e inside the hydrogen separation membrane 16f. The hydrogen discharge port 16b communicates with the space on the outside of the hydrogen separation membrane 16f, which is included in the space inside the housing 16d. In this case, ammonia is supplied to the space inside the hydrogen separation membrane 16f, and the ammonia is cracked inside the hydrogen separation membrane 16f. The hydrogen contained in the cracked gas generated inside the hydrogen separation membrane 16f permeates through the hydrogen separation membrane 16f to move toward the outside and is discharged from the space on the outside of the hydrogen separation membrane 16f, which is included in the space inside the housing 16d, via the hydrogen discharge port 16b.

As illustrated in FIG. 1, the hydrogen generator-separator 16 is arranged on an upstream side of the vaporizer 15 in the exhaust flow passage 102. Thermal energy required for the vaporization of ammonia in the vaporizer 15 is smaller than thermal energy required for heating of the ammonia cracking catalyst 16e. Hence, when the hydrogen generator-separator 16 is arranged on the upstream side of the vaporizer 15 in the exhaust flow passage 102, the heating of the ammonia cracking catalyst 16e to a temperature around which the cracking of ammonia actively occurs is appropriately achieved along with the vaporization of ammonia.

The first cooling device 41, the second pump 22, and the second flow rate control valve 32 are arranged in the flow passage 104 in the stated order from the upstream side. The first cooling device 41 cools hydrogen that flows on an upstream side of the second pump 22 in the flow passage 104. For example, the first cooling device 41 is a device that cools hydrogen flowing through the flow passage 104 with cooling water or air. The first cooling device 41 may be a device that allows heat to be exchanged between an upstream side of the vaporizer 15 in the flow passage 103 and an upstream side of the second pump 22 in the flow passage 104. When hydrogen flowing on the upstream side of the second pump 22 in the flow passage 104 is cooled, a temperature of hydrogen sent to the second pump 22 is decreased. Hence, a volume of hydrogen sent to the second pump 22 is decreased, and thus energy used by the second pump 22 to compress hydrogen is reduced.

The second pump 22 compresses hydrogen discharged from the hydrogen generator-separator 16, and feeds the compressed hydrogen to the downstream side. The hydrogen fed by the second pump 22 is sent to the combustor 13 through the second flow rate control valve 32. The second flow rate control valve 32 controls a flow rate of hydrogen flowing through the flow passage 104. When an opening degree of the second flow rate control valve 32 is adjusted, the amount of hydrogen supplied from the hydrogen generator-separator 16 to the combustor 13 is adjusted.

As described above, in the gas turbine system 1, the ammonia tank 14 is connected to the ammonia supply port 16a of the hydrogen generator-separator 16. The combustor 13 is connected to the hydrogen discharge port 16b of the hydrogen generator-separator 16. Thus, the cracking of ammonia into hydrogen and nitrogen and the supply of the obtained hydrogen to the combustor 13 are achieved.

The hydrogen generator-separator 16 is arranged on a downstream side of the turbine 11b in the exhaust flow passage 102. Thus, the ammonia cracking catalyst 16e of the hydrogen generator-separator 16 is heated with the exhaust gas flowing through the exhaust flow passage 102 to a temperature around which the cracking of ammonia actively occurs. As described above, when heat of the exhaust gas flowing through the exhaust flow passage 102 is effectively used, the cracking of ammonia into hydrogen and nitrogen and the supply of the obtained hydrogen to the combustor 13 are appropriately achieved.

Further, hydrogen is separated in the hydrogen generator-separator 16 by using the hydrogen separation membrane 16f. Thus, the cracking of ammonia is promoted. Hence, even when thermal energy given to the hydrogen generator-separator 16 is small to some extent, a supply amount of hydrogen to the combustor 13 can be maintained at a predetermined level. For example, energy that is consumed to ensure the supply amount of hydrogen to the combustor 13 can be reduced as compared to energy used with a method of generating hydrogen from ammonia by using only the ammonia cracking catalyst 16e. Hence, according to this embodiment, efficiency of the gas turbine system 1 is improved.

Now, with reference to FIG. 3 to FIG. 10, gas turbine systems according to modification examples are described.

Figure 3:
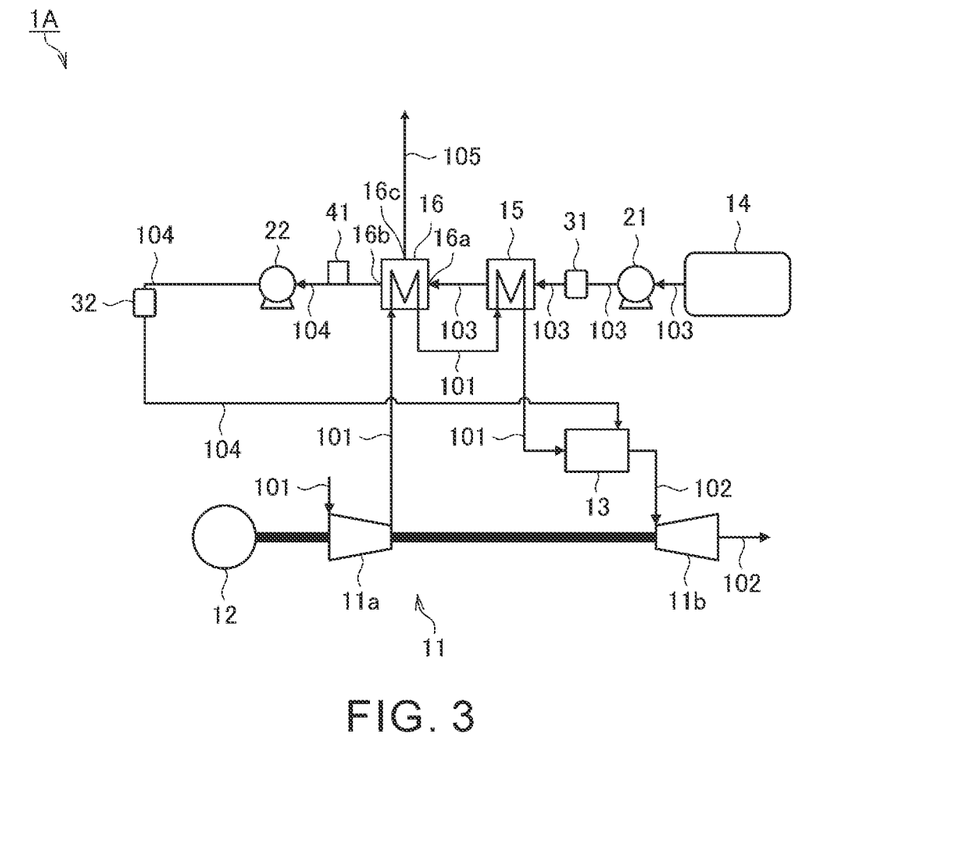
FIG. 3 is a schematic view for illustrating a configuration of a gas turbine system according to a first modification example.

FIG. 3 is a schematic view for illustrating a configuration of a gas turbine system 1A according to a first modification example. As illustrated in FIG. 3, the gas turbine system 1A according to the first modification example is different from the gas turbine system 1 described above in arrangement of a hydrogen generator-separator 16.

As illustrated in FIG. 3, in the gas turbine system 1A according to the first modification example, the hydrogen generator-separator 16 is arranged on a downstream side of a compressor 11a in an intake flow passage 101. Thus, an ammonia cracking catalyst 16e of the hydrogen generator-separator 16 is heated with the air flowing through the intake flow passage 101 to a temperature around which the cracking of ammonia actively occurs. As described above, when heat of the air flowing through the intake flow passage 101 is effectively used, the cracking of ammonia into hydrogen and nitrogen and the supply of the obtained hydrogen to the combustor are appropriately achieved. Hence, as in the gas turbine system 1 described above, efficiency of the gas turbine system 1A is improved.

As described above, the hydrogen generator-separator 16 may be arranged on a downstream side of a turbine 11b in an exhaust flow passage 102 or on the downstream side of the compressor 11a in the intake flow passage 101. However, a pressure of air discharged from the compressor 11a is higher than a pressure of the exhaust gas that has passed through the turbine 11b. Hence, when the hydrogen generator-separator 16 is arranged on the downstream side of the compressor 11a in the intake flow passage 101, pressure resistance of the hydrogen generator-separator 16 is required to be increased. Thus, in view of the improvement of the degree of freedom in the pressure resistance of the hydrogen generator-separator 16, it is preferred that the hydrogen generator-separator 16 be arranged on the downstream side of the turbine 11b in the exhaust flow passage 102.

Figure 4:
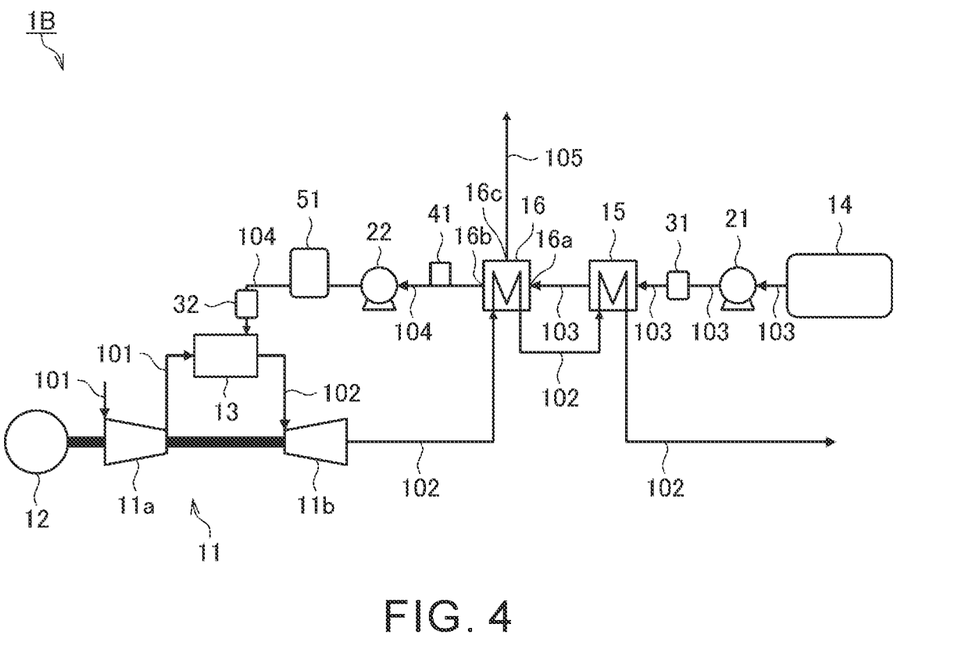
FIG. 4 is a schematic view for illustrating a configuration of a gas turbine system according to a second modification example.

FIG. 4 is a schematic view for illustrating a configuration of a gas turbine system 1B according to a second modification example. As illustrated in FIG. 4, the gas turbine system 1B according to the second modification example is different from the gas turbine system 1 described above in that a first gas reservoir 51 is added.

As illustrated in FIG. 4, in the gas turbine system 1B according to the second modification example, a hydrogen discharge port 16b of a hydrogen generator-separator 16 is connected to a combustor 13 with the first gas reservoir 51 provided therebetween. The first gas reservoir 51 stores hydrogen. The first gas reservoir 51 is provided on a downstream side of a second pump 22 and on an upstream side of a second flow rate control valve 32 in a flow passage 104. Hydrogen fed by the second pump 22 is sent to and stored in the first gas reservoir 51. The hydrogen stored in the first gas reservoir 51 is sent to the combustor 13 through the second flow rate control valve 32.

As described above, in the second modification example, hydrogen discharged from the hydrogen generator-separator 16 is stored in the first gas reservoir 51. Hence, when the gas turbine system 1B in which hydrogen is not generated by the hydrogen generator-separator 16 is activated, the hydrogen stored in the first gas reservoir 51 can be supplied to the combustor 13. Further, when a required value of a supply amount of hydrogen to the combustor 13 is abruptly increased or decreased, the supply amount of hydrogen to the combustor 13 can be changed with high responsiveness thereto. Hence, excess and deficiency in the supply amount of hydrogen to the combustor 13 are suppressed.

Figure 5:
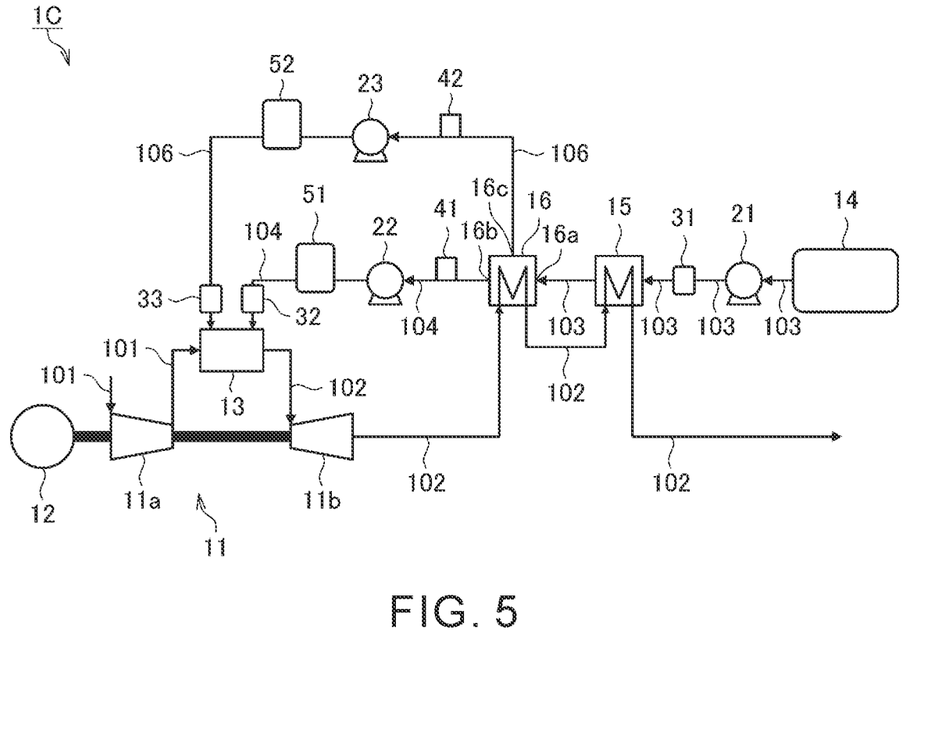
FIG. 5 is a schematic view for illustrating a configuration of a gas turbine system according to a third modification example.

FIG. 5 is a schematic view for illustrating a configuration of a gas turbine system 1C according to a third modification example. As illustrated in FIG. 5, the gas turbine system 1C according to the third modification example is different from the gas turbine system 1B described above in that a nitrogen discharge port 16c of a hydrogen generator-separator 16 is connected to a combustor 13.

The combustor 13 is connected to the nitrogen discharge port 16c of the hydrogen generator-separator 16 through intermediation of a flow passage 106. A second cooling device 42, a third pump 23, a second gas reservoir 52, and a third flow rate control valve 33 are arranged in the flow passage 106 in the stated order from the upstream side. The second cooling device 42 cools gas containing residual ammonia that flows on an upstream side of the third pump 23 in the flow passage 106. For example, the second cooling device 42 is a device that cools gas flowing through the flow passage 106 with cooling water or air. The second cooling device 42 may be a device that allows heat to be exchanged between an upstream side of a vaporizer 15 in a flow passage 103 and an upstream side of the third pump 23 in the flow passage 106. When the gas flowing on the upstream side of the third pump 23 in the flow passage 106 is cooled, a temperature of the gas sent to the third pump 23 is decreased. Hence, a volume of the gas sent to the third pump 23 is decreased, and thus energy used by the third pump 23 to compress the gas is reduced.

The third pump 23 compresses gas containing residual ammonia discharged from the hydrogen generator-separator 16, and feeds the compressed gas to a downstream side. The gas fed by the third pump 23 is sent to and stored in the second gas reservoir 52. The gas stored in the second gas reservoir 52 is sent to the combustor 13 through the third flow rate control valve 33. The third flow rate control valve 33 controls a flow rate of gas flowing through the flow passage 106. When an opening degree of the third flow rate control valve 33 is adjusted, the amount of gas containing residual ammonia supplied from the hydrogen generator-separator 16 to the combustor 13 is adjusted.

As described above, in the third modification example, the nitrogen discharge port 16c of the hydrogen generator-separator 16 is connected to the combustor 13. Thus, not only hydrogen but also residual ammonia can be supplied as fuel to the combustor 13. Hence, a purification device for purifying residual ammonia discharged from the nitrogen discharge port 16c is not required. Further, energy obtained as a result of combustion in the combustor 13 can be increased.

Further, as described above, in the third modification example, the nitrogen discharge port 16c of the hydrogen generator-separator 16 is connected to the combustor 13 with the second gas reservoir 52 provided therebetween. Hence, the gas containing residual ammonia discharged from the hydrogen generator-separator 16 is stored in the second gas reservoir 52. Thus, when the combustion in the combustor 13 becomes stable to achieve a combustion state suitable for combustion processing for residual ammonia, the residual ammonia stored in the second gas reservoir 52 can be supplied to the combustor 13.

Figure 6:
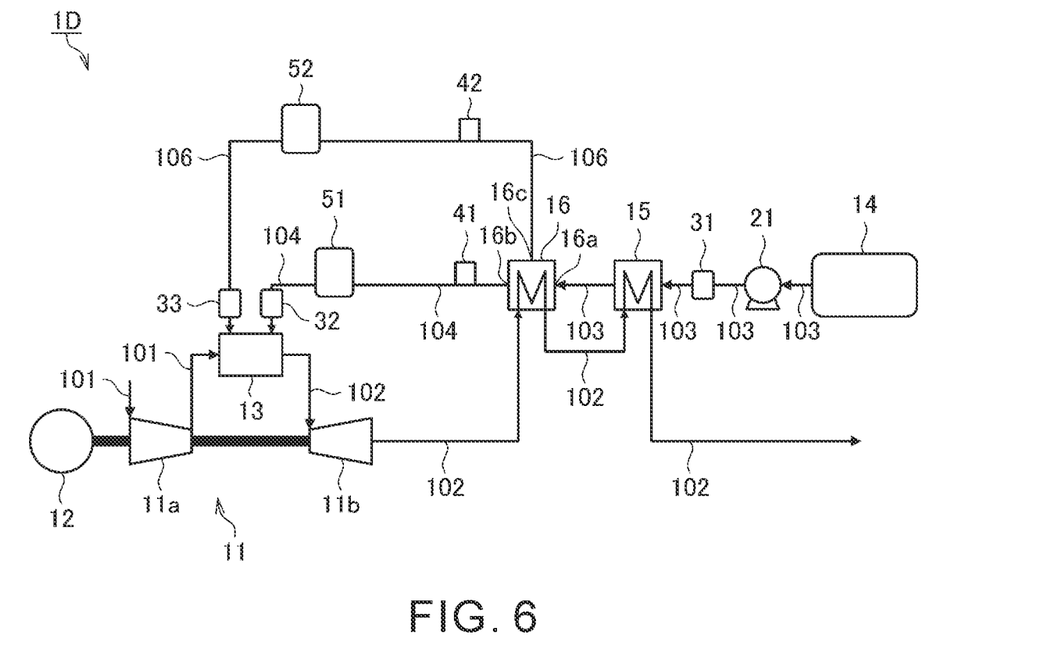
FIG. 6 is a schematic view for illustrating a configuration of a gas turbine system according to a fourth modification example.

FIG. 6 is a schematic view for illustrating a configuration of a gas turbine system 1D according to a fourth modification example. As illustrated in FIG. 6, the gas turbine system 1D according to the fourth modification example is different from the gas turbine system 1C described above in that the second pump 22 and the third pump 23 are not provided.

When gas serving as fuel is supplied to the combustor 13, a pressure of the gas to be supplied is required to be set higher than a pressure in the combustor 13. Thus, in the gas turbine system 1C, the pressure of hydrogen supplied to the combustor 13 is raised by the second pump 22, and a pressure of gas containing residual ammonia, which is supplied to the combustor 13, is raised by the third pump 23. Energy is required to drive the second pump 22 and the third pump 23.

As descried above, in the fourth modification example, no pump is provided in a flow passage 104 that connects a hydrogen discharge port 16b of a hydrogen generator-separator 16 and the combustor 13 to each other and a flow passage 106 that connects a nitrogen discharge port 16c of the hydrogen generator-separator 16 and the combustor 13 to each other. A first pump 21 is provided as a pump in a flow passage 103 that connects an ammonia tank 14 and an ammonia supply port 16a of the hydrogen generator-separator 16 to each other. When a pressure of liquid ammonia is raised to a sufficiently high pressure by the first pump 21, hydrogen and gas containing residual ammonia can be supplied to the combustor 13 even without the second pump 22 and the third pump 23. Hence, the energy for driving the second pump 22 and the third pump 23 can be saved. Accordingly, efficiency of the gas turbine system 1D is improved.

It is preferred that the first cooling device 41 and the second cooling device 42 be also provided in the gas turbine system 1D according to the fourth modification example as in the case of the gas turbine system 1C described above. When hydrogen flowing on an upstream side of a first gas reservoir 51 in the flow passage 104 is cooled by the first cooling device 41, a temperature of the hydrogen sent to the first gas reservoir 51 is decreased. Hence, a reduction in temperature of the hydrogen stored in the first gas reservoir 51 during storage and an excessive decrease in pressure in the first gas reservoir 51 are suppressed. When gas containing residual ammonia flowing on an upstream side of a second gas reservoir 52 in the flow passage 106 is cooled by the second cooling device 42, a temperature of gas sent to the second gas reservoir 52 is decreased. Hence, a reduction in temperature of gas stored in the second gas reservoir 52 during storage and an excessive decrease in pressure in the second gas reservoir 52 are suppressed.

Figure 7:
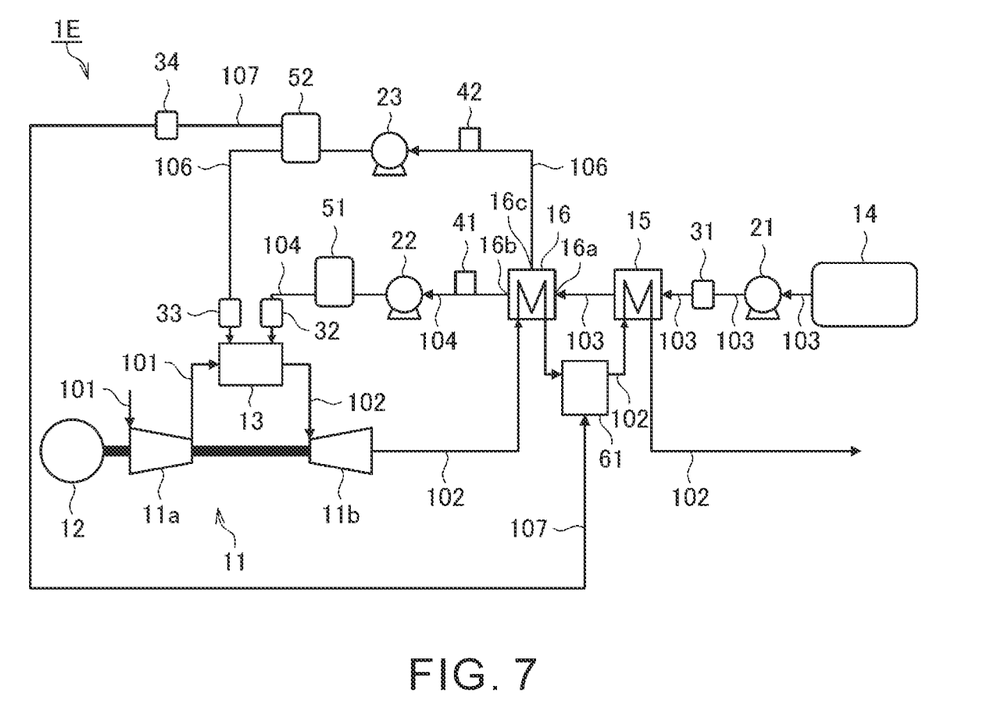
FIG. 7 is a schematic view for illustrating a configuration of a gas turbine system according to a fifth modification example.

FIG. 7 is a schematic view for illustrating a configuration of a gas turbine system 1E according to a fifth modification example. As illustrated in FIG. 7, the gas turbine system 1E according to the fifth modification example is different from the gas turbine system 1C described above in that a nitrogen discharge port 16c of a hydrogen generator-separator 16 is connected to a denitration device 61.

The denitration device 61 causes nitrogen oxide (NOx) flowing through an exhaust flow passage 102 to react with ammonia to decompose nitrogen oxide into nitrogen and water. The denitration device 61 is provided on a downstream side of a turbine 11b in the exhaust flow passage 102. In an example illustrated in FIG. 7, the denitration device 61 is arranged on a downstream side of the hydrogen generator-separator 16 and on an upstream side of a vaporizer 15 in the exhaust flow passage 102. However, the denitration device 61 may be arranged on a downstream side of the vaporizer 15 in the exhaust flow passage 102. Thermal energy required for vaporization of ammonia in the vaporizer 15 is smaller than thermal energy required for the cracking of nitrogen oxide in the denitration device 61. Hence, when the denitration device 61 is arranged on the upstream side of the vaporizer 15 in the exhaust flow passage 102, the cracking of nitrogen oxide is appropriately achieved along with the vaporization of ammonia.

As illustrated in FIG. 7, in the gas turbine system 1E according to the fifth modification example, a second gas reservoir 52 and the denitration device 61 are connected to each other through intermediation of a flow passage 107. A fourth flow rate control valve 34 is provided in the flow passage 107. Gas containing residual ammonia, which is stored in the second gas reservoir 52, is sent to the denitration device 61 through the fourth flow rate control valve 34. The fourth flow rate control valve 34 controls a flow rate of gas flowing through the flow passage 107. When an opening degree of the fourth flow rate control valve 34 is adjusted, the amount of gas containing residual ammonia supplied from the second gas reservoir 52 to the denitration device 61 is adjusted.

As described above, in the fifth modification example, the nitrogen discharge port 16c of the hydrogen generator-separator 16 is connected to the denitration device 61. Thus, residual ammonia discharged from the hydrogen generator-separator 16 can be effectively used for the cracking of nitrogen oxide in the denitration device 61.

In the example illustrated in FIG. 7, the nitrogen discharge port 16c of the hydrogen generator-separator 16 is connected to the denitration device 61 with the second gas reservoir 52 provided therebetween. However, for example, when the second gas reservoir 52 is not provided, the nitrogen discharge port 16c of the hydrogen generator-separator 16 may be connected to the denitration device 61 without the second gas reservoir 52 therebetween.

Figure 8:
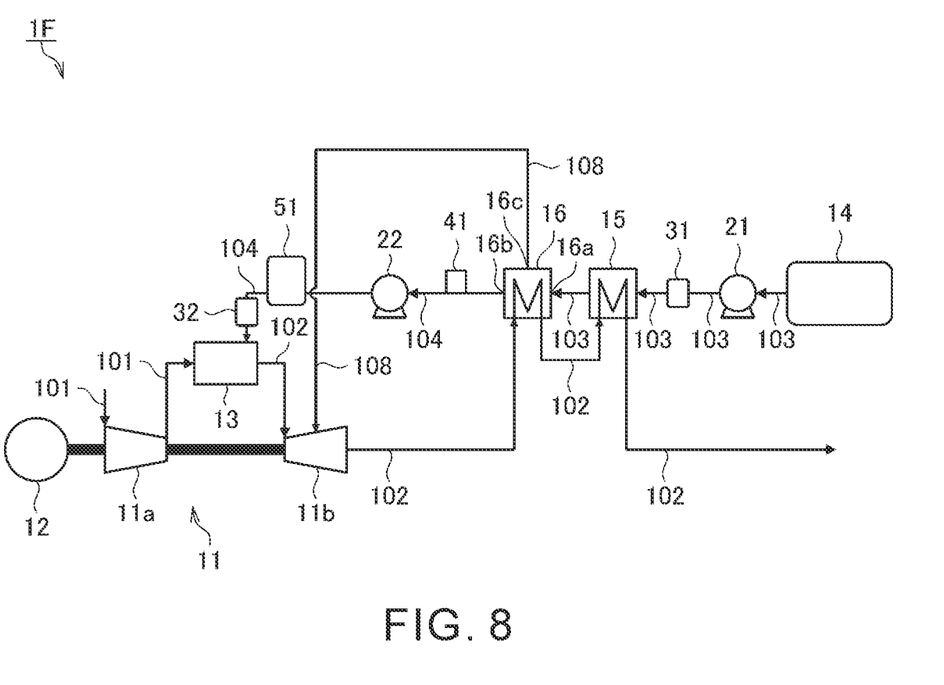
FIG. 8 is a schematic view for illustrating a configuration of a gas turbine system according to a sixth modification example.

FIG. 8 is a schematic view for illustrating a configuration of a gas turbine system 1F according to a sixth modification example. As illustrated in FIG. 8, the gas turbine system 1F according to the sixth modification example is different from the gas turbine system 1B described above in that a nitrogen discharge port 16c of a hydrogen generator-separator 16 is connected to a turbine 11b.

As illustrated in FIG. 8, in the gas turbine system 1F according to the sixth modification example, the nitrogen discharge port 16c of the hydrogen generator-separator 16 is connected to the turbine 11b through intermediation of a flow passage 108. Gas containing residual ammonia, which is discharged from the nitrogen discharge port 16c, is sent to the turbine 11b via the flow passage 108. When the turbine 11b has multi-stage blade bodies, the nitrogen discharge port 16c of the hydrogen generator-separator 16 may be connected to, for example, an intermediate stage corresponding to a portion between the blade bodies of the turbine 11b or an upstream side of a blade body located on an uppermost stream side.

As described above, in the sixth modification example, the nitrogen discharge port 16c of the hydrogen generator-separator 16 is connected to the turbine 11b. Thus, the turbine 11b is rotated by the gas containing residual ammonia, which is discharged from the hydrogen generator-separator 16. Hence, rotational power generated by a turbocharger 11 can be increased. Further, the residual ammonia that has passed through the turbine 11b is supplied to a denitration device (not shown) provided in an exhaust flow passage 102, and is also effectively used for the cracking of nitrogen oxide.

Figure 9:
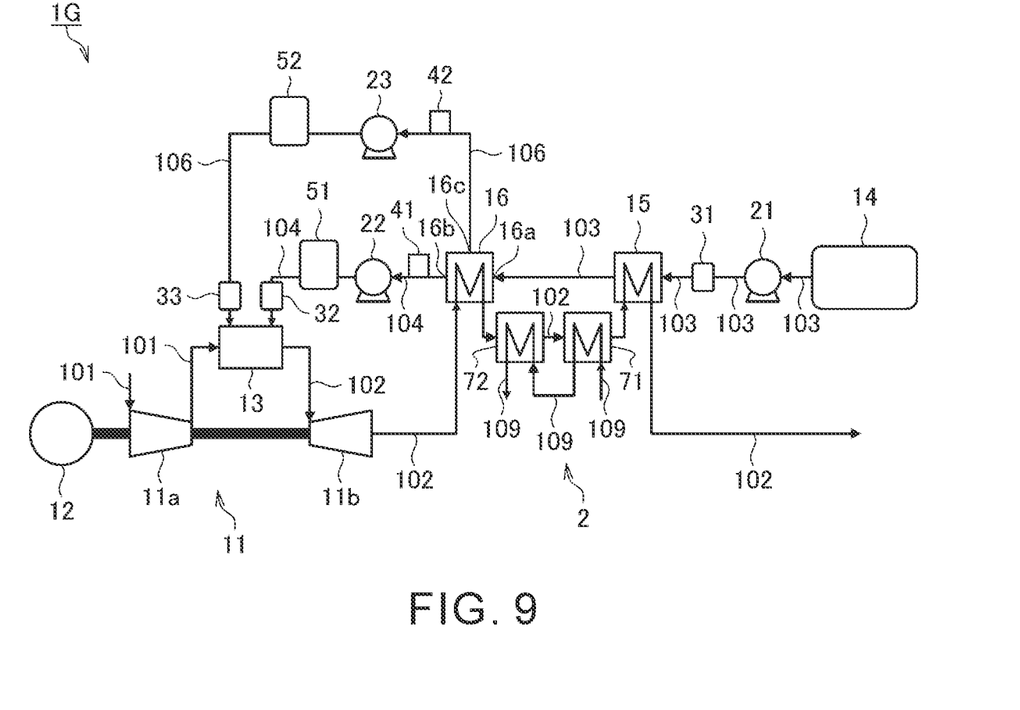
FIG. 9 is a schematic view for illustrating a configuration of a gas turbine system according to a seventh modification example.

FIG. 9 is a schematic view for illustrating a configuration of a gas turbine system 1G according to a seventh modification example. As illustrated in FIG. 9, the gas turbine system 1G according to the seventh modification example is different from the gas turbine system 1C described above in that a part thereof is shared by a different system 2.

The system 2 is a power generation system including a flow passage 109, a heat exchanger 71, and a heat exchanger 72. Water flows through the flow passage 109. Although the flow passage 109 is illustrated in a simplified manner in FIG. 9, the flow passage 109 forms a closed circuit. Specifically, water circulates through the flow passage 109. A turbine (not shown) is provided in the flow passage 109. Power is obtained by the turbine with use of flow of steam.

The heat exchanger 71 and the heat exchanger 72 are arranged on a downstream side of a hydrogen generator-separator 16 and on an upstream side of a vaporizer 15 in an exhaust flow passage 102. The heat exchanger 71 is provided on a downstream side of the heat exchanger 72 in the exhaust flow passage 102. The heat exchanger 71 is provided on an upstream side of the heat exchanger 72 in the flow passage 109. Liquid water flowing through the flow passage 109 is heated in the heat exchanger 71 with an exhaust gas flowing through the exhaust flow passage 102. Then, the heated liquid water is heated again in the heat exchanger 72 with the exhaust gas flowing through the exhaust flow passage 102, and is vaporized into steam. Then, the turbine (not shown) is rotated by the steam to thereby generate rotational power.

As described above, in the seventh modification example, the gas turbine system 1G has a part shared by the different system 2. A configuration and a purpose of use of the different system 2 that shares a part of the gas turbine system 1G are not limited to those in the example described above. For example, there has been described an example in which the system 2 uses steam to generate electric power in a combined cycle. However, the system 2 may be a cogeneration system in which steam is generated while electric power is not generated. In such a case, the same effects as those obtained by the gas turbine system 1 described above are obtained.

In the example illustrated in FIG. 9, the heat exchanger 71 and the heat exchanger 72 are arranged on the downstream side of the hydrogen generator-separator 16 and on the upstream side of the vaporizer 15 in the exhaust flow passage 102. However, the heat exchanger 71 and the heat exchanger 72 may be arranged on a downstream side of the vaporizer 15 in the exhaust flow passage 102. Thermal energy required for the vaporization of ammonia in the vaporizer 15 is smaller than thermal energy required for heating of water flowing through the flow passage 109 in the heat exchanger 71 and the heat exchanger 72. Thus, when the heat exchanger 71 and the heat exchanger 72 are arranged on the upstream side of the vaporizer 15 in the exhaust flow passage 102, sufficient heating of water in the flow passage 109 is appropriately achieved along with the vaporization of ammonia.

Figure 10:
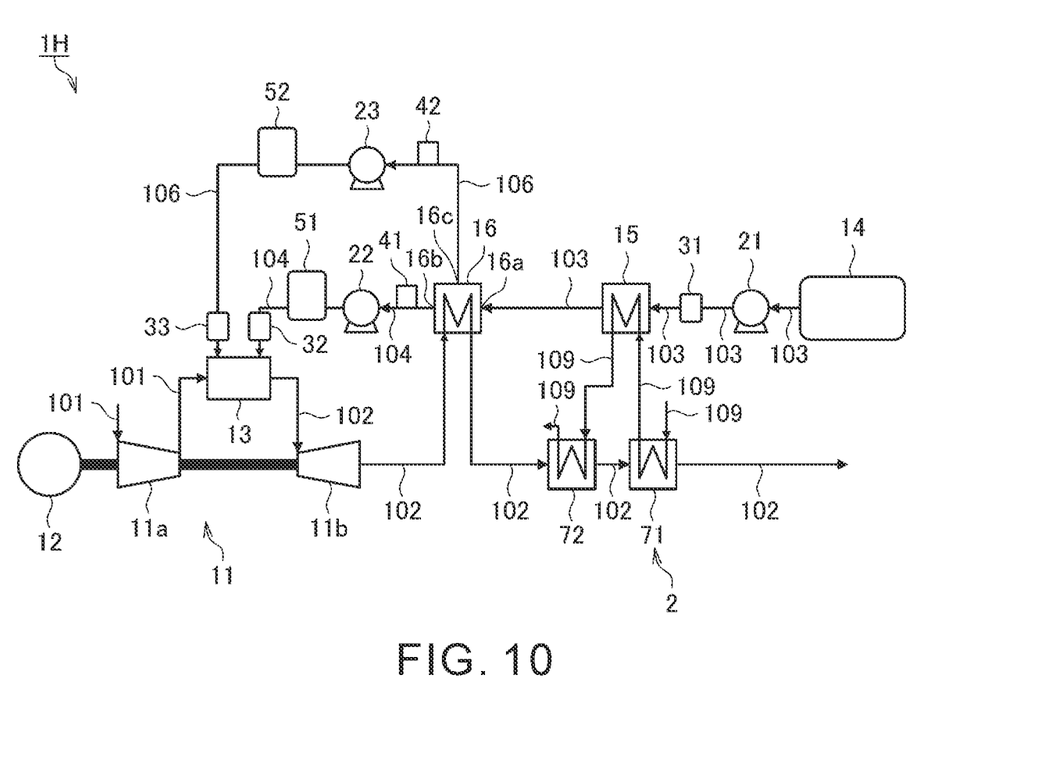
FIG. 10 is a schematic view for illustrating a configuration of a gas turbine system according to an eighth modification example.

FIG. 10 is a schematic view for illustrating a configuration of a gas turbine system 1H according to an eighth modification example. As illustrated in FIG. 10, the gas turbine system 1H according to the eighth modification example is different from the gas turbine system 1C described above in that a part thereof is shared by a different system 2.

As in the gas turbine system 1G described above, the system 2 is a power generation system including a flow passage 109, a heat exchanger 71, and a heat exchanger 72. Configurations of the flow passage 109, the heat exchanger 71, and the heat exchanger 72 are the same as those in the gas turbine system 1G described above, and thus description thereof is omitted.

As illustrated in FIG. 10, in the gas turbine system 1H according to the eighth modification example, the heat exchanger 71 and the heat exchanger 72 are arranged on a downstream side of a hydrogen generator-separator 16 in an exhaust flow passage 102. The heat exchanger 71 is provided on a downstream side of the heat exchanger 72 in the exhaust flow passage 102. The heat exchanger 71 is provided on an upstream side of the heat exchanger 72 in the flow passage 109. In the gas turbine system 1H, the vaporizer 15 is arranged on the downstream side of the heat exchanger 71 and on the upstream side of the heat exchanger 72 in the flow passage 109. More specifically, ammonia in the vaporizer 15 and water flowing through the flow passage 109 can exchange heat under a state in which an inside of the vaporizer 15 and an inside of the flow passage 109 are not in communication with each other. The liquid ammonia sent to the vaporizer 15 is heated with the water flowing through the flow passage 109, and is vaporized.

As described above, in the eighth modification example, the gas turbine system 1H has a part shared by the different system 2. Similarly to the gas turbine system 1G described above, a configuration and a purpose of use of the different system 2 that shares a part of the gas turbine system 1H are not limited to those in the example described above. In such a case, the same effects as those obtained by the gas turbine system 1 described above are obtained.

In the gas turbine system 1G described above, for example, a pipe for an exhaust gas is arranged in the vicinity of the vaporizer 15 so as to allow heat exchange between the vaporizer 15 and an exhaust gas. Meanwhile, in the gas turbine system 1H, for example, a pipe for water is arranged in the vicinity of the vaporizer 15 so as to allow heat exchange between the vaporizer 15 and water. The pipe for water is generally thinner than the pipe for an exhaust gas. Hence, the pipe can more easily be arranged in the vicinity of the vaporizer 15 in the gas turbine system 1H than in the gas turbine system 1G described above.

Further, in the gas turbine system 1H, water flowing through the flow passage 109 is used to heat ammonia in the vaporizer 15. Meanwhile, in the gas turbine system 1G described above, water flowing through the flow passage 109 is not used to heat ammonia in the vaporizer 15. Hence, the gas turbine system 1G described above has improved energy efficiency in the system 2 as compared to that in the gas turbine system 1H.

The embodiment of the present disclosure has been described above with reference to the attached drawings, but, needless to say, the present disclosure is not limited to the above-mentioned embodiment. It is apparent that those skilled in the art may arrive at various alternations and modifications within the scope of claims, and those examples are construed as naturally falling within the technical scope of the present disclosure.

There have been described examples in which the rotational power generated by the turbocharger 11 is used as energy for driving the power generator 12 in the gas turbine systems 1, 1A, 1B, 1C, 1D, 1E, 1F, 1G, and 1H. However, the rotational power generated by the turbocharger 11 in the gas turbine systems 1, 1A, 1B, 1C, 1D, 1E, 1F, 1G, and 1H may be used for other purposes of use, for example, for the purpose of driving a mobile body such as a vessel.

There has been described an example in which the hydrogen generator-separator 16 is arranged on the downstream side of the compressor 11a in the intake flow passage 101 in the gas turbine system 1A. However, the hydrogen generator-separator 16 may be arranged on the downstream side of the compressor 11a in the intake flow passage 101 in the gas turbine systems 1B, 1C, 1D, 1E, 1F, 1G, and 1H.

There have been described examples in which the first pump 21 is provided in the gas turbine systems 1, 1A, 1B, 1C, 1D, 1E, 1F, 1G, and 1H. However, the first pump 21 is not required to be provided as long as the pressure of ammonia supplied to the hydrogen generator-separator 16 can be increased to a predetermined level or higher in the gas turbine systems 1, 1A, 1B, 1C, 1D, 1E, 1F, 1G, and 1H. For example, the first pump 21 may be replaced by a pressure control valve.

There have been described examples in which the first gas reservoir 51 is provided in the gas turbine systems 1C, 1D, 1E, 1F, 1G, and 1H. However, the first gas reservoir 51 is not required to be provided in the gas turbine systems 1C, 1D, 1E, 1F, 1G, and 1H.

There have been described examples in which the second gas reservoir 52 is provided in the gas turbine systems 1C, 1D, 1E, 1G, and 1H. However, the second gas reservoir 52 is not required to be provided in the gas turbine systems 1C, 1D, 1E, 1G, and 1H.

There have been described examples in which the second pump 22 is provided in the gas turbine systems 1, 1A, 1B, 1C, 1E, 1F, 1G, and 1H. However, the second pump 22 is not required to be provided in the gas turbine systems 1, 1A, 1B, 1C, 1E, 1F, 1G, and 1H.

There have been described examples in which the third pump 23 is provided in the gas turbine systems 1C, 1E, 1G, and 1H. However, the third pump 23 is not required to be provided in the gas turbine systems 1C, 1E, 1G, and 1H.

There has been described an example in which the nitrogen discharge port 16c of the hydrogen generator-separator 16 is connected to the denitration device 61 in the gas turbine system 1E. However, the nitrogen discharge port 16c of the hydrogen generator-separator 16 may be connected to the denitration device 61 in the gas turbine systems 1, 1A, 1B, 1C, 1D, 1F, 1G, and 1H.

There has been described an example in which the nitrogen discharge port 16c of the hydrogen generator-separator 16 is connected to the turbine 11b in the gas turbine system 1F. However, the nitrogen discharge port 16c of the hydrogen generator-separator 16 may be connected to the turbine 11b in the gas turbine systems 1, 1A, 1B, 1C, 1D, 1E, 1G, and 1H.

There have been described examples in which the gas turbine systems 1G and 1H have a part shared by the different system 2. However, similarly to the gas turbine system 1G or the gas turbine system 1H, the gas turbine systems 1, 1A, 1B, 1C, 1D, 1E, and 1F may have a part shared by the different system 2.

There have been described examples in which not only hydrogen but also residual ammonia is supplied as fuel to the combustor 13 in the gas turbine systems 1C, 1D, 1E, 1G, and 1H. In this case, hydrogen and residual ammonia may be separately supplied to the combustor 13 or may be mixed together in advance and then supplied to the combustor 13.

The flow passages have been described with reference to the drawings. However, each of the above-mentioned flow passages may be branched into a plurality of pipes. For example, the first gas reservoir 51 and the combustor 13 may be connected to each other through intermediation of a plurality of pipes, and the second gas reservoir 52 and the combustor 13 may be connected to each other through intermediation of a plurality of pipes.

There have been described an example in which the fuel supplied to the combustor 13 is hydrogen and an example in which the fuel supplied to the combustor 13 is hydrogen and residual ammonia. However, fuel other than hydrogen and residual ammonia may be further supplied to the combustor 13. For example, liquid ammonia stored in the ammonia tank 14 may be supplied to the combustor 13 without passing through the hydrogen generator-separator 16. Further, for example, liquid ammonia stored in the ammonia tank 14 may be vaporized and then be supplied to the combustor 13 without passing through the hydrogen generator-separator 16. In order to supply ammonia to the combustor 13 without passage through the hydrogen generator-separator 16, for example, a flow passage branching from the flow passage 103 may be added. The flow passage bypasses the hydrogen generator-separator 16, and is connected to the combustor 13. In order to supply ammonia to the combustor 13 without passage through the hydrogen generator-separator 16, a pump may be added. In order to supply gaseous ammonia to the combustor 13 without passage through the hydrogen generator-separator 16, a vaporizer may be added.

The present disclosure serves to improve efficiency of a gas turbine system. Thus, for example, the present disclosure can contribute to achievement of Goal 7 "Ensure access to affordable, reliable, sustainable and modern energy for all" of Sustainable Development Goals (SDGs).

The invention claimed is:

1. A gas turbine system, comprising:
    a combustor;
    an intake flow passage connected to the combustor;
    an exhaust flow passage connected to the combustor;
    a compressor provided in the intake flow passage;
    a turbine provided in the exhaust flow passage;
    an ammonia tank;
    a hydrogen generator-separator having an ammonia supply port connected to the ammonia tank and a hydrogen discharge port connected to the combustor, the hydrogen generator-separator being arranged on a downstream side of the turbine in the exhaust flow passage or on a downstream side of the compressor in the intake flow passage, the hydrogen generator-separator including an ammonia cracking catalyst and a hydrogen separation membrane,
    wherein the hydrogen generator-separator has a nitrogen discharge port, and
    wherein the gas turbine system further comprises a flow passage that connects the nitrogen discharge port and the turbine bypassing the combustor.

2. The gas turbine system according to claim 1,
    wherein the hydrogen discharge port of the hydrogen generator-separator is connected to the combustor with a first gas reservoir provided therebetween, and wherein the first gas reservoir is connected to the combustor with a flow rate control valve provided therebetween.

3. The gas turbine system according to claim 1, wherein the nitrogen discharge port of the hydrogen generator-separator is connected to the combustor with a second gas reservoir provided therebetween, and
wherein the second gas reservoir is connected to the combustor with a flow rate control valve provided therebetween.

4. The gas turbine system according to claim 1, wherein a pump is provided in a flow passage that connects the ammonia tank and the ammonia supply port of the hydrogen generator-separator to each other.

5. The gas turbine system according to claim 2,
wherein a denitration device is provided on a downstream side of the turbine in the exhaust flow passage, and
wherein the nitrogen discharge port of the hydrogen generator-separator is connected to the denitration device.

6. The gas turbine system according to claim 3,
wherein a denitration device is provided on a downstream side of the turbine in the exhaust flow passage, and
wherein the nitrogen discharge port of the hydrogen generator-separator is connected to the denitration device.

7. The gas turbine system according to claim 4,
wherein a denitration device is provided on a downstream side of the turbine in the exhaust flow passage, and
wherein the nitrogen discharge port of the hydrogen generator-separator is connected to the denitration device.

8. A gas turbine system, comprising:
a combustor;
an intake flow passage connected to the combustor;
an exhaust flow passage connected to the combustor;
a compressor provided in the intake flow passage;
a turbine provided in the exhaust flow passage;
an ammonia tank; and
a hydrogen generator-separator having an ammonia supply port connected to the ammonia tank and a hydrogen discharge port connected to the combustor, the hydrogen generator-separator being arranged on a downstream side of the turbine in the exhaust flow passage or on a downstream side of the compressor in the intake flow passage, the hydrogen generator-separator including an ammonia cracking catalyst and a hydrogen separation membrane,
wherein the hydrogen generator-separator has a nitrogen discharge port,
wherein a denitration device is provided on a downstream side of the turbine in the exhaust flow passage, and
wherein the gas turbine system further comprises a flow passage that connects the nitrogen discharge port and the denitration device bypassing the combustor and the turbine.

9. A gas turbine system, comprising:
a combustor;
an intake flow passage connected to the combustor;
an exhaust flow passage connected to the combustor;
a compressor provided in the intake flow passage;
a turbine provided in the exhaust flow passage;
an ammonia tank; and
a hydrogen generator-separator having an ammonia supply port connected to the ammonia tank and a hydrogen discharge port connected to the combustor, the hydrogen generator-separator being arranged on a downstream side of the turbine in the exhaust flow passage or on a downstream side of the compressor in the intake flow passage, the hydrogen generator-separator including an ammonia cracking catalyst and a hydrogen separation membrane, wherein the hydrogen generator-separator has a nitrogen discharge port, wherein a denitration device is provided on a downstream side of the turbine in the exhaust flow passage, and wherein the nitrogen discharge port of the hydrogen generator-separator is connected via a flow passage to the turbine bypassing the combustor.

* * * * *